United States Patent [19]

Miles

[11] Patent Number: 4,827,714
[45] Date of Patent: May 9, 1989

[54] GAS TURBINE FUEL CONTROL SYSTEM
[75] Inventor: Barry D. Miles, Bristol, England
[73] Assignee: Rolls-Royce plc, England
[21] Appl. No.: 174,957
[22] Filed: Mar. 29, 1988
[30] Foreign Application Priority Data
Apr. 10, 1987 [GB] United Kingdom ............... 8708595
[51] Int. Cl.$^4$ .............................................. F02K 3/10
[52] U.S. Cl. .................................. 60/261; 60/39.091; 60/734
[58] Field of Search ................ 60/261, 39.281, 39.091, 60/734, 739, 746

[56] References Cited

U.S. PATENT DOCUMENTS 4,557,106  12/1985  Williams et al. ................. 60/39.281

FOREIGN PATENT DOCUMENTS 733529   7/1955   United Kingdom ............ 60/39.091
1555736  11/1979  United Kingdom ............ 60/39.281

Primary Examiner—Donald E. Stout
Attorney, Agent, or Firm—Parkhurst, Oliff & Berridge

[57] ABSTRACT

A fuel system for a gas turbine engine in which there is provided a filter 20 having its output connected to the fuel control system 24 that controls fuel flow to the main combustors 26 of the engine. A bypass pipe 25, which has a pressure relief valve 29, by-passes the filter 20 and is connected to the inlet of a fuel control system 23 that controls the flow of fuel to the reheat burners 28 of the engine. A connecting pipe 30 connects the output of the filter to the reheat fuel control system. In normal operation, filtered fuel is supplied to both fuel control systems 24, 27 and there is no flow in the filter by-pass pipe 25. As the filter 20 becomes progressively blocked, filtered fuel is supplied to the main combustors 26 irrespective of whether or not reheat is required. When reheat is selected, and the filter 20 is too blocked to meet the flow demand, relief valve 29 opens to supply unfiltered flow to the reheat burners. In the unlikely event that the filter 20 becomes so blocked as to be incapable of supplying filtered fuel to the main combustors 26, then unfiltered fuel will be supplied to the main control system 24 through the connecting pipe 30.

2 Claims, 2 Drawing Sheets

GAS TURBINE FUEL CONTROL SYSTEM

This invention relates to fuel systems for gas turbine engines and in particular to filters for such systems.

An essential feature of fuel systems is the provision of a filter to prevent contaminants blocking vital parts of the fuel control system, jets or vaporisers. The filters have to be designed to cope with the maximum demand of fuel flow even with a predetermined level of blockage of the filter. This usually means that filters are designed to be far larger than for normal maximum demands with unblocked filters or requires a larger number of filters working for the most part at part of their flow capacity. These filters are extremely heavy, costly, and take up valuable space. Even then they do not offer a totally satisfactory solution to the problems of filter blockage.

A fuel system for a military gas turbine engine fitted with a reheat system has to cope with flow rates of hundreds of gallons per hour when reheat is selected and also cope with much lower flow rates of a few gallons per hour when reheat is not selected. Therefore filters capable of operating at hundreds of gallons per hour partially blocked must also be designed not to impede flow at a few gallons per hour with the same amount of blockage. This usually means that filters are designed grossly oversize so that even with 75% blockage the pressure drop through the filter still permits low level flow rates.

One prior known fuel filter system capable of coping with these conflicting requirements is shown in FIG. 1. A very large filter is provided and a by-pass pipe is provided around the filter. The by-pass pipe is provided with a one way pressure relief valve which opens in the event that the filter becomes blocked and allows unfiltered fuel to flow to the main fuel control systems which control the supply of fuel to the main combustors of the engine and to the reheat system. The by-pass valve can be set so that it only opens when the filter is blocked. One major problem with this known arrangement is that unfiltered fuel contaminates the control system and jeopardises the operation of the engine both with and without reheat selected.

It is understood that, in general, the reheat fuel control system is not so affected by contaminants than would be the main fuel control systems which employs very small passages and jets and uses the fuel to operate different pressure sensors, feedback loops, servo systems, pressure ratio controllers and other devices to effect flow control to meet the pilot's demands. Reheat systems tend to be less susceptible to blockages because the flow passages are designed to cope with larger flow rates and do not have the same level of sophistication as main engine fuel control systems.

An object of the present invention is to provide a fuel filter system for a gas turbine engine which does not suffer from the aforementioned problems.

The invention is claimed overcomes the aforementioned problems because when the filter becomes blocked and maximum flow rates for reheat are demanded the unfiltered fuel is fed directly to the reheat burners and not to the main engine fuel control system and filtered fuel flow is supplied to the main fuel control system.

The present invention will now be described by way of an example with reference to the accompanying drawings in which.

Figure 1:
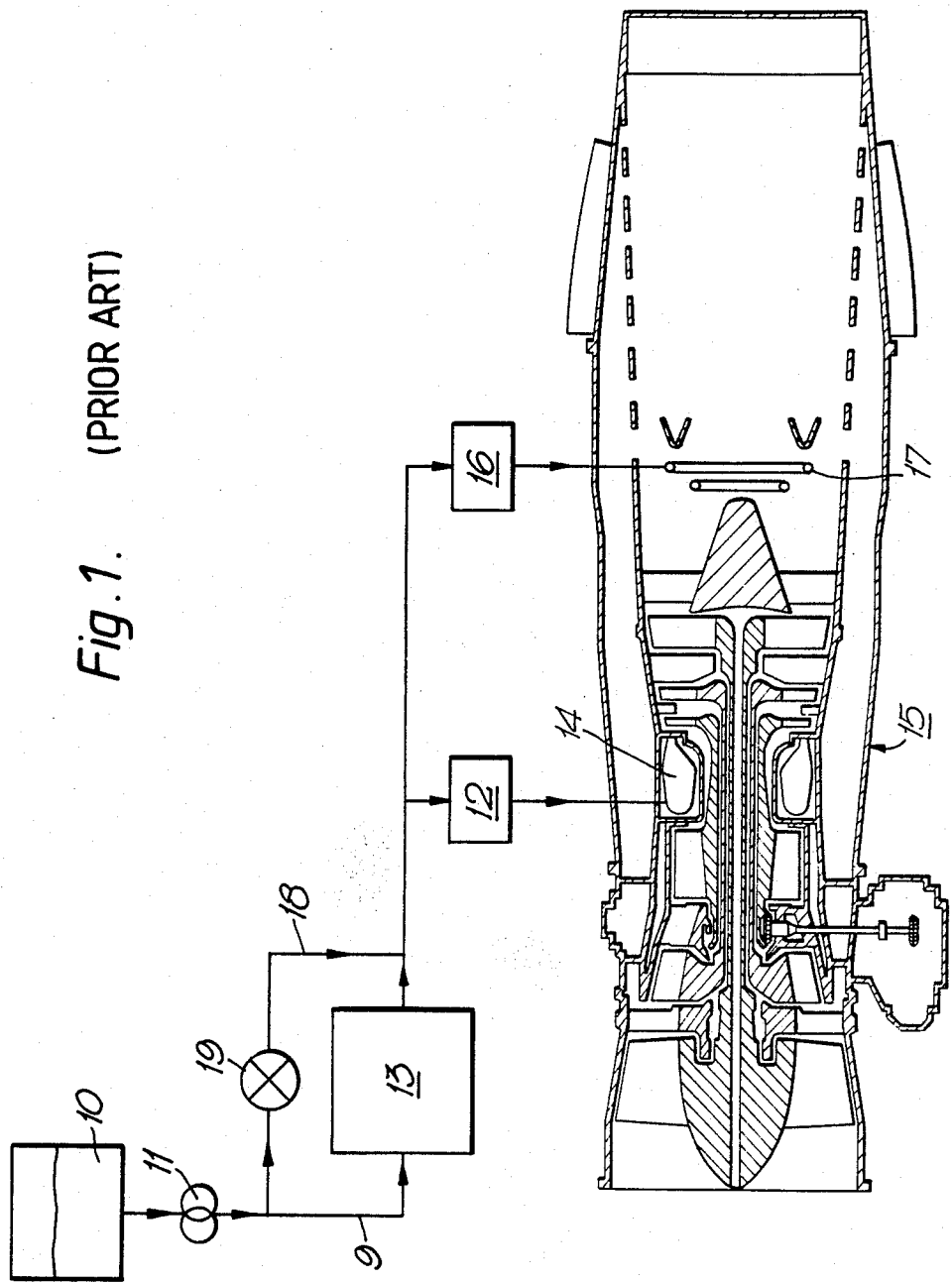
FIG. 1 is a diagrammatic illustration of a prior known and widely used filter system for a fuel control system.

Referring to FIG. 1 there is shown a known filter system for a reheated military gas turbine engine. The system comprises a fuel supply pipe 9 through which fuel from a fuel tank 10 is pumped under pressure by a pump 11 to a filter 13. The output of the filter 13 is supplied to the main engine fuel control system 12 which is of conventional design and thence to the main combustor 14 of the engine 15 and also to be reheat control system 16 and burners 17. A by-pass pipe 18 is provided which allows unfiltered fuel to by-pass the filter 13 in the event that the filter 13 becomes blocked. To control the flow through the by-pass pipe 18, the pipe 18 is provided with a pressure relief valve 19 which opens when the filter becomes blocked a predetermined amount.

The filter is dimensioned and shaped to cope with the maximum flow demands of the main engine control system 12 and the reheat system 16 even when blocked by say 75%. This means that the filter 13 is grossly oversize, overweight, VERY costly, and still suffers from the problem of allowing unfiltered fuel to reach the main engine control system.

Figure 2:
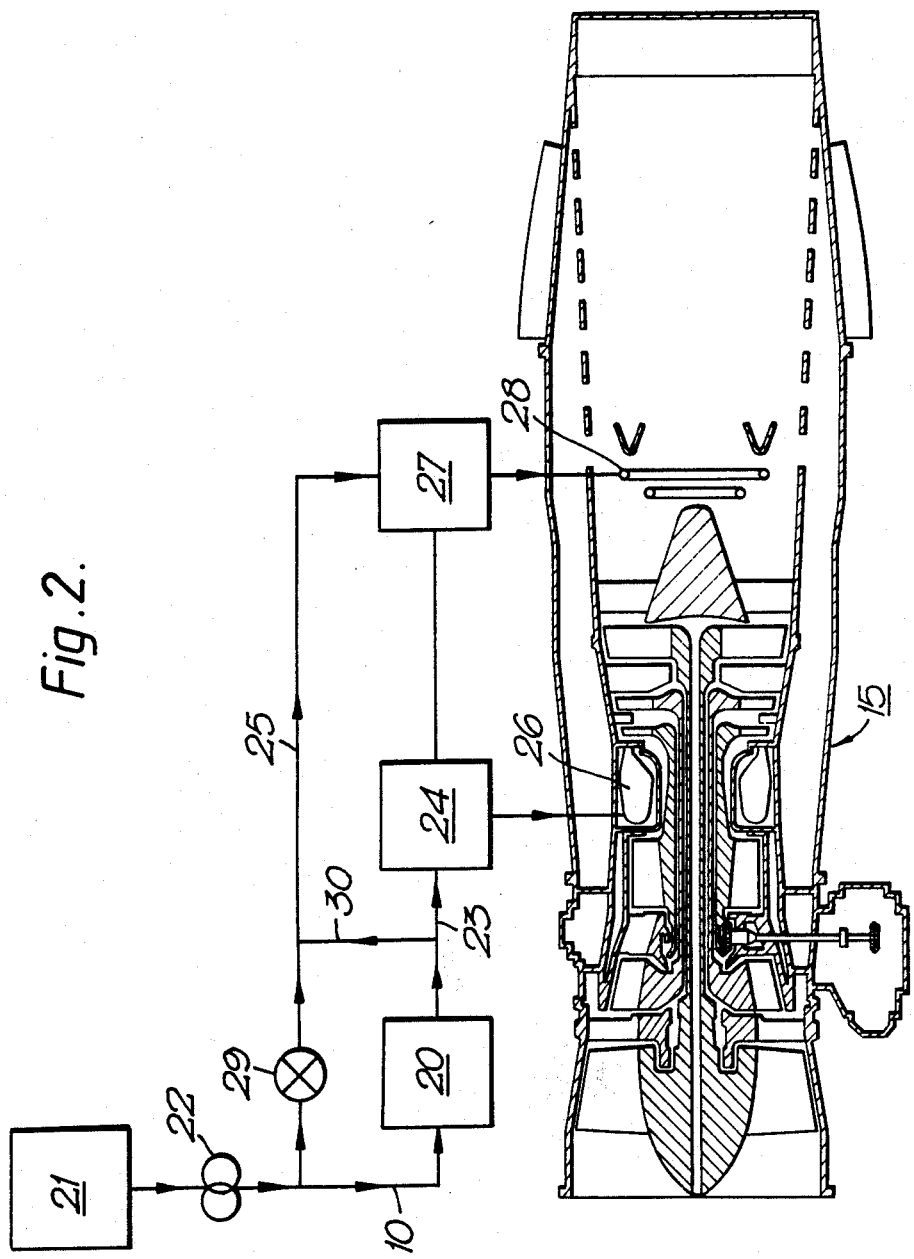
FIG. 2 is a diagrammatic illustration of a fuel filter system for a gas turbine engine constructed in accordance with the present invention.

Referring to FIG. 2, there is shown a filter system in accordance with the present invention. In this system the filter 20 is supplied with fuel under pressure from a fuel tank 21 by means of a pump 22. The output of the filter is supplied by means of a pipe 23 directly to the input of a conventional main engine fuel control system 24 which is of conventional design and therefore forms no inventive part of the present invention and thence to the main engine combustors 26. A filter by-pass pipe 25 is provided which connects the supply pipe 10 to the reheat control system 27 and thence to the reheat burners 28. A pressure relief valve 29 is provided in the pipe 25.

The filter 20 is dimensioned to cope with maximum flow demands for the main combustor and the reheat system when the filter is unblocked but not when the filter is partially blocked. This means that for most of the life of the filter 20 even when it is say 75% blocked it can readily supply filters fuel to at least the main engine fuel control system 24. As the filter becomes progressively more blocked the pressure relief valve will open. Hence for reheat flow rates, the relief valve 29 will open to allow flows demanded by the reheat system whilst the main fuel control system 24 receives filtered fuel.

In the present invention the filter 20 is smaller, lighter, and cheaper than that of the known systems because it only has to cope with the demands of the main engine fuel control system 24.

A pipe 30 is provided to connect the output flow from the filter to the by-pass pipe 25 downstream of the valve 29. During normal use filtered fuel is supplied to the re-heat burners through the pipe 30. If the filter 20 becomes partially blocked, but not to the extent that would impair flow the main fuel control system 24 the valve 29 opens to supplement the supply to the re-heat burners 28.

In the extreme event that the filter becomes too blocked even to supply the main fuel control system 24 the relief valve 29 opens and some unfiltered fuel is supplied via the pipe 30 to the main fuel control system 24. Whilst this is not desirable, it is better to supply some unfiltered fuel than not to supply any in these extreme cases.

I claim:

1. A fuel system for a gas turbine engine comprising a filter having an inlet connected to a source of supply of fuel and an outlet connected to a fuel flow control system that controls fuel flow to the main combustors of the engine, a by-pass pipe connected to the inlet to receive fuel from the source and connected to a fuel flow control system that controls fuel flow to reheat burners of the engine, and a connecting pipe which connects the output of the filter to the reheat burners, said by-pass pipe having a pressure relief valve which opens in the event that the filter becomes blocked a predetermined amount thereby to supply unfiltered fuel to the reheat burners to at least partially fulfill the fuel requirements thereof, while the fuel requirements of the main combustors are satisfied by filtered fuel flow.

2. A fuel system according to claim 1 wherein the filter, connecting pipe and by-pass pipe allow unfiltered fuel to be supplied via the connecting pipe to the fuel control system that controls the flow of fuel to the main combustors of the engine only when the filter becomes blocked to a second predetermined amount which is greater than the first predetermined amount.

* * * * *